United States Patent
Takahashi

(10) Patent No.: US 12,098,270 B2
(45) Date of Patent: Sep. 24, 2024

(54) SEALANT MATERIAL COMPOSITION AND PNEUMATIC TIRE

(71) Applicant: The Yokohama Rubber Co., LTD., Tokyo (JP)

(72) Inventor: Kiyohito Takahashi, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 1039 days.

(21) Appl. No.: 16/982,572

(22) PCT Filed: Feb. 28, 2019

(86) PCT No.: PCT/JP2019/007818
§ 371 (c)(1),
(2) Date: Sep. 20, 2020

(87) PCT Pub. No.: WO2019/181415
PCT Pub. Date: Sep. 26, 2019

(65) Prior Publication Data
US 2021/0009798 A1      Jan. 14, 2021

(30) Foreign Application Priority Data

Mar. 20, 2018 (JP) .................................. 2018-052549
Aug. 10, 2018 (JP) .................................. 2018-151651

(51) Int. Cl.
*C08L 23/28* (2006.01)
*B60C 1/00* (2006.01)
(Continued)

(52) U.S. Cl.
CPC .......... *C08L 23/283* (2013.01); *B60C 1/0041* (2013.01); *B60C 19/122* (2013.01);
(Continued)

(58) Field of Classification Search
CPC . C08L 23/283; C08L 7/00; C08L 9/00; B60C 1/0041; B60C 19/122; C08K 3/04;
(Continued)

(56) References Cited

U.S. PATENT DOCUMENTS 3,935,893 A     2/1976  Stang et al.
4,632,963 A *  12/1986  Gardner .................... C08F 8/18
                                                                    525/357
(Continued)

FOREIGN PATENT DOCUMENTS

JP      S53-97046       8/1978
JP      S57-042753      3/1982
(Continued)

OTHER PUBLICATIONS

Machine translation of WO 2017179576 A1 (Year: 2017).*
International Search Report for International Application No. PCT/JP2019/007818 dated Jun. 4, 2019, 4 pages, Japan.

*Primary Examiner* — Doris L Lee
(74) *Attorney, Agent, or Firm* — Thorpe North & Western

(57) ABSTRACT

As the sealant material composition forming a sealant layer of a pneumatic tire provided with the sealant layer on a tire inner surface, the sealant material composition prepared by blending from 0.1 parts by mass to 20 parts by mass of a crosslinking agent, from 0.1 parts by mass to 40 parts by mass of an organic peroxide, and from 10 parts by mass to 400 parts by mass of a liquid polymer per 100 parts by mass of a butyl rubber is used.

6 Claims, 1 Drawing Sheet

(51) Int. Cl.
  *B60C 19/12* (2006.01)
  *C08K 3/04* (2006.01)
  *C08K 3/06* (2006.01)
  *C08K 5/14* (2006.01)
  *C08K 5/40* (2006.01)
  *C08K 11/00* (2006.01)
  *C08L 7/00* (2006.01)

(52) U.S. Cl.
  CPC .................. *C08K 3/04* (2013.01); *C08K 3/06* (2013.01); *C08K 5/14* (2013.01); *C08K 5/40* (2013.01); *C08K 11/005* (2013.01); *C08L 7/00* (2013.01)

(58) Field of Classification Search
  CPC ... C08K 3/06; C08K 5/14; C08K 5/40; C08K 11/005; C08K 5/0025
  See application file for complete search history.

(56) References Cited

U.S. PATENT DOCUMENTS

| | | | |
|---|---|---|---|
| 2003/0230376 A1* | 12/2003 | Smith, Sr. | B60C 1/00 156/115 |
| 2012/0118464 A1* | 5/2012 | Ruegg, Jr. | B29D 30/30 156/123 |
| 2017/0291379 A1* | 10/2017 | Yukawa | B29D 30/0685 |
| 2017/0297281 A1 | 10/2017 | Yukawa et al. | |
| 2017/0305210 A1 | 10/2017 | Yukawa et al. | |
| 2018/0200972 A1 | 7/2018 | Yukawa et al. | |
| 2018/0200976 A1 | 7/2018 | Yukawa et al. | |
| 2018/0200977 A1 | 7/2018 | Yukawa et al. | |
| 2018/0201774 A1 | 7/2018 | Sugimoto et al. | |
| 2018/0207998 A1 | 7/2018 | Yukawa et al. | |
| 2018/0208687 A1 | 7/2018 | Sugimoto et al. | |
| 2019/0091951 A1 | 3/2019 | Kayashima | |

FOREIGN PATENT DOCUMENTS

| | | | |
|---|---|---|---|
| JP | 2006-152110 | | 6/2006 |
| JP | 2016-078510 | | 5/2016 |
| JP | 2016-098296 | | 5/2016 |
| JP | 2016-108540 | | 6/2016 |
| JP | 2017-101096 | | 6/2017 |
| WO | WO 2016/060229 | | 4/2016 |
| WO | WO 2016/060233 | | 4/2016 |
| WO | WO 2016/060234 | | 4/2016 |
| WO | WO 2016/060235 | | 4/2016 |
| WO | WO 2016/060236 | | 4/2016 |
| WO | WO 2016/060239 | | 4/2016 |
| WO | WO 2016/060244 | | 4/2016 |
| WO | WO 2016/060246 | | 4/2016 |
| WO | WO 2016/060247 | * | 4/2016 |
| WO | WO 2017/094653 | | 6/2017 |
| WO | WO 2017/179576 | * | 10/2017 |

* cited by examiner

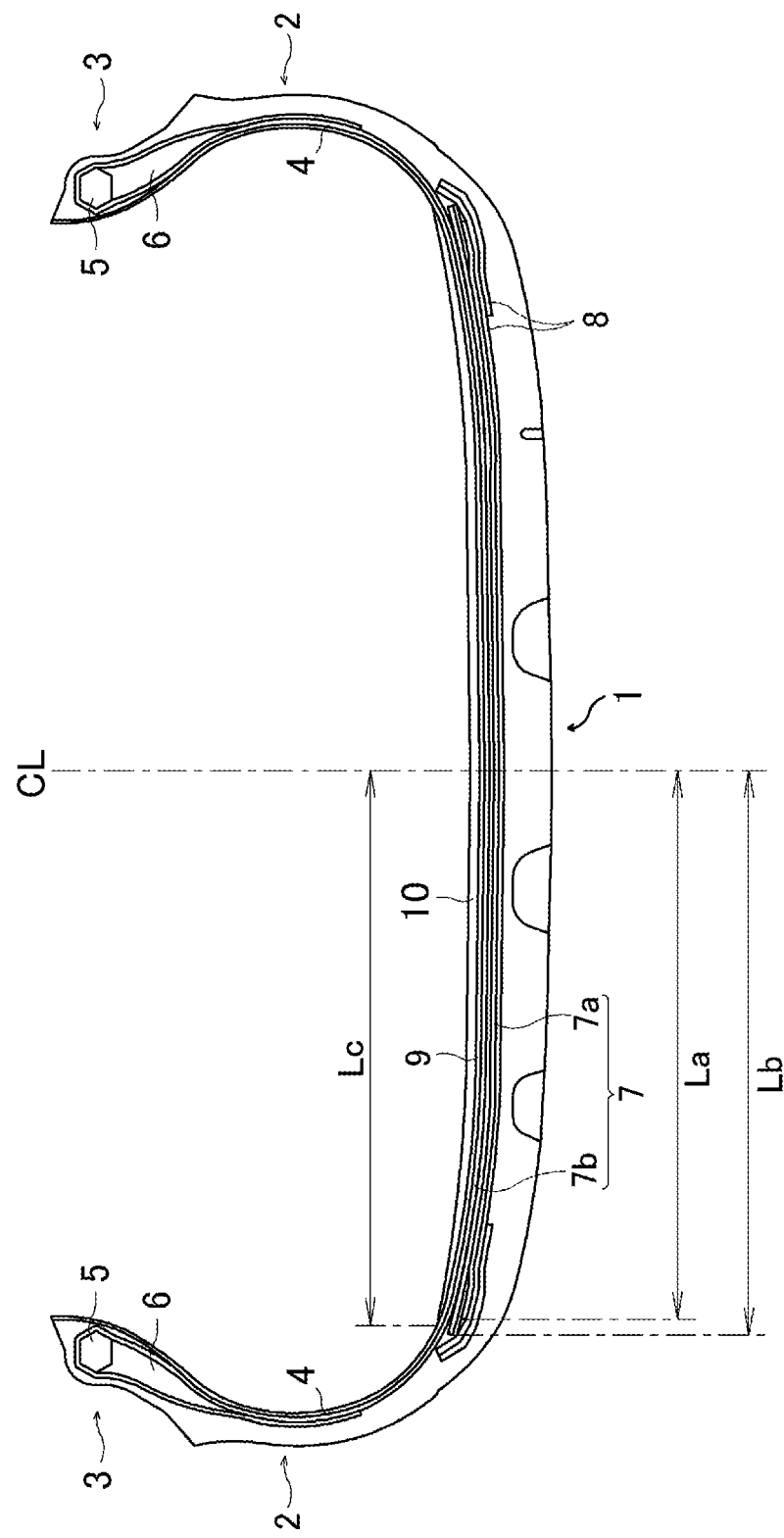

SEALANT MATERIAL COMPOSITION AND PNEUMATIC TIRE

TECHNICAL FIELD

The present technology relates to a sealant material composition that forms a sealant layer of a self-sealing type pneumatic tire provided with a sealant layer on a tire inner surface, and a pneumatic tire using the sealant material composition.

BACKGROUND ART

In pneumatic tires, it has been proposed to provide a sealant layer on the inner side of the innerliner layer in the tire radial direction of the tread portion (for example, see Japan Unexamined Patent Publication No. 2006-152110). In such a pneumatic tire, when a foreign substance such as a nail or the like penetrates into the tread portion, the sealant flows into the through hole, which makes it possible to suppress reduction in air pressure and to maintain travel.

In the self-sealing type pneumatic tire described above, when the viscosity of the sealant is lowered, the sealant may provide improved sealing properties because it easily flow into the through hole. However, the sealant inadvertently flows toward the tire center side due to the effects of heat and centrifugal force applied during traveling, and as a result, there is a risk that traveling performance such as steering stability and the like may be negatively affected. On the other hand, when the viscosity of the sealant is increased in order to prevent flow of the sealant, sealing properties may deteriorate. Thus, it is difficult to ensure good sealing properties while suppressing flow of the sealant due to traveling, and there is a demand for a measure for providing these performances in a well-balanced, compatible manner by improving the physical properties of the sealant material composition that forms the sealant layer.

SUMMARY

The present technology provides a sealant material composition that makes it possible to ensure good sealing properties and to suppress flow of sealant due to traveling, and a pneumatic tire.

The sealant material composition according to an embodiment of the present technology may form a sealant layer of a pneumatic tire provided with the sealant layer on a tire inner surface, and is prepared by blending from 0.1 parts by mass to 20 parts by mass of a crosslinking agent, from 0.1 parts by mass to 40 parts by mass of an organic peroxide, and from 10 parts by mass to 400 parts by mass of a liquid polymer per 100 parts by mass of a rubber component.

Because of the blending as described above, the sealant material composition according to an embodiment of the present technology contains a liquid polymer to impart a reasonably high viscosity to the rubber component, and at the same time, uses a crosslinking agent and an organic peroxide in combination to perform crosslinking, so that the sealant material composition can obtain suitable elasticity that does not flow during traveling while ensuring sufficient viscosity to obtain good sealing properties, and can provide these performances in a well-balanced, compatible manner.

In the sealant material composition according to an embodiment of the present technology, the rubber component is preferably butyl rubber, and more preferably the butyl rubber is a halogenated butyl rubber. Furthermore, the crosslinking agent is preferably sulfur. This increases reactivity with the crosslinking agent (sulfur) and the organic peroxide, and the sealant material composition can provide improved processability.

In the sealant material composition according to an embodiment of the present technology, a ratio A/B of a blending amount A of the crosslinking agent to a blending amount B of the organic peroxide is preferably from 5/1 to 1/200. By defining the blending ratio of the crosslinking agent to the organic peroxide as described above, the physical properties of the sealant material composition are improved, which is advantageous for providing ensuring of sealing properties and suppression of sealant flow in a well-balanced, compatible manner.

In the sealant material composition according to an embodiment of the present technology, the liquid polymer is preferably a liquid rubber capable of co-crosslinking with a rubber in the sealant material composition. This improves the physical properties of the sealant material composition, which is advantageous for providing ensuring of sealing properties and suppression of sealant flow in a well-balanced, compatible manner.

In the sealant material composition according to an embodiment of the present technology, the organic peroxide preferably has a 1-minute half-life temperature from 100° C. to 200° C. This improves the physical properties of the sealant material composition, which is advantageous for providing ensuring of sealing properties and suppression of sealant flow in a well-balanced, compatible manner. In particular, variations in the performance of the sealant material composition can be suppressed. Note that in the present technology, "1-minute half-life temperature" generally refers to the value described in the "Organic Peroxide Catalog No. 10 Ed." from NOF Corp., and, if not stated, the value determined from thermal decomposition in an organic solvent in the identical manner as described in the catalog is employed.

In the sealant material composition according to an embodiment of the present technology, the sealant material composition preferably includes a vulcanization accelerator. This allows the vulcanization rate to be increased, which can enhance productivity.

In the sealant material composition according to an embodiment of the present technology, the vulcanization accelerator is preferably a thiuram vulcanization accelerator. This improves the physical properties of the sealant material composition, which is advantageous for providing ensuring of sealing properties and suppression of sealant flow in a well-balanced, compatible manner. In particular, variations in the performance of the sealant material composition can be suppressed.

In the sealant material composition according to an embodiment of the present technology, an amount from 0.1 parts by mass to 20 parts by mass of carbon black is preferably blended per 100 parts by mass of the rubber component. At this time, the sealant material composition is preferably produced by mixing a part of the rubber component, the crosslinking agent, and the carbon black, followed by mixing with the organic peroxide and the liquid polymer. By including the carbon black in this manner, sealing properties can be ensured over a longer period of time. Furthermore, by mixing the components in this order, ensuring of sealing properties and suppression of sealant flow can be provided in a better-balanced, compatible manner.

In the method for manufacturing a pneumatic tire provided with a sealant layer made of the sealant material composition according to an embodiment of the present technology described above on a tire inner surface, the sealant material composition is preferably heated at a temperature from 140° C. to 180° C. for a heating time from 5 minutes to 30 minutes. This improves the physical properties of the sealant material composition, which is advantageous for providing ensuring of sealing properties and suppression of sealant flow in a well-balanced, compatible manner. In particular, variations in the performance of the sealant material composition can be suppressed.

The sealant material composition according to an embodiment of the present technology described above can be suitably used in a sealant layer of a pneumatic tire including a tread portion having an annular shape extending in a tire circumferential direction;

a pair of sidewall portions disposed on both sides of the tread portion; and a pair of bead portions disposed on an inner side of the sidewall portions in a tire outer diameter direction, and having at least the sealant layer on an inner side of an innerliner layer in a tire radial direction of the tread portion, and at this time, the innerliner layer contains a halogenated butyl rubber. This makes it possible to improve adhesion between the innerliner layer and the sealant layer.

In the pneumatic tire according to an embodiment of the present technology, the sealant layer preferably has a thickness from 0.5 mm to 5.0 mm. By configuring the thickness of the sealant layer to be within a suitable range in this way, sealant flow can be suppressed while good sealing properties are ensured. Furthermore, processability at the time of attaching the sealant layer to the tire inner surface is also improved.

The pneumatic tire according to an embodiment of the present technology can have a specification in which the sealant layer is formed by attaching a sheet-like molded sealant material made of the sealant material composition according to an embodiment of the present technology described above entirely around a circumference of a tire inner surface. Alternatively, the pneumatic tire can have a specification in which the sealant layer is formed by spirally attaching a string-like or band-like molded sealant material made of the sealant material composition according to an embodiment of the present technology described above to a tire inner surface. In either case, the sealant layer can be efficiently and reliably provided in a desired region.

In the pneumatic tire according to an embodiment of the present technology, a center position of the sealant layer in a tire lateral direction is preferably arranged within a range of ±10 mm in the tire lateral direction from a tire equator. Thus, by providing the sealant layer, impact on the uniformity of the pneumatic tire can be prevented.

In the pneumatic tire according to an embodiment of the present technology, a plurality of belt layers are embedded in the tread portion, a layer having a smallest belt width of the plurality of belt layers is a minimum belt layer, a layer having a largest belt width of the plurality of belt layers is a maximum belt layer, a distance from the tire equator to an end portion of the minimum belt layer is La, a distance from the tire equator to an end portion of the maximum belt layer is Lb, and a distance from the tire equator to an end portion of the sealant layer in the tire lateral direction is Lc, and the distances La, Lb, Lc preferably satisfy the relationship La≤Lc≤1.05×Lb. Thus, flow at the end portion of the sealant layer can be effectively suppressed while sealing properties are ensured with the sealant layer covering the appropriate range.

BRIEF DESCRIPTION OF THE DRAWING

The drawing is a meridian cross-sectional view illustrating an example of a self-sealing type pneumatic tire according to an embodiment of the present technology.

DETAILED DESCRIPTION

Configurations of embodiments of the present technology will be described in detail below with reference to the accompanying drawings.

In the sealant material composition according to an embodiment of the present technology, the rubber component is any of natural rubber, butyl rubber, or styrene-butadiene rubber, and particularly preferably is butyl rubber. Any butyl rubber that is regularly used in sealant material compositions can be used. In particular, from the viewpoint of reactivity with the crosslinking agent (sulfur) and organic peroxide described below and processability, a halogenated butyl rubber such as abrominated butyl rubber or a chlorinated butyl rubber is preferably used.

The sealant material composition according to an embodiment of the present technology is always blended with a crosslinking agent and an organic peroxide. Note that the organic peroxide is also a kind of crosslinking agent, but the "crosslinking agent" in the present technology excludes organic peroxides, and refers to, for example, sulfur, quinone dioxime, and the like. Sulfur is particularly preferably used as the crosslinking agent other than organic peroxides. By blending the crosslinking agent and the organic peroxide in combination in this manner, a suitable degree of crosslinking can be achieved to provide ensuring of sealing properties and prevention of sealant flow in a compatible manner. The crosslinking agent is blended in an amount from 0.1 parts by mass to 20 parts by mass, preferably from 0.5 parts by mass to 10.0 parts by mass, per 100 parts by mass of the rubber component described above. The organic peroxide is blended in an amount from 0.1 parts by mass to 40 parts by mass, preferably from 5 parts by mass to 20 parts by mass, per 100 parts by mass of the butyl rubber described above. When the amount of the crosslinking agent is less than 0.1 parts by mass, the content of the crosslinking agent is substantially the identical as that in which the crosslinking agent is not included, and appropriate crosslinking cannot be performed. When the amount of the crosslinking agent exceeds 20 parts by mass, crosslinking of the sealant material composition proceeds too far, and sealing properties may decline. When the amount of the organic peroxide is less than 0.1 parts by mass, the content of the organic peroxide is substantially the identical as that in which the organic peroxide is not included, and appropriate crosslinking cannot be performed. When the amount of the organic peroxide exceeds 20 parts by mass, crosslinking of the sealant material composition proceeds too far, and sealing properties may decline.

When the crosslinking agent and the organic peroxide are used in combination in this manner, the ratio A/B of the blending amount A of the crosslinking agent to the blending amount B of the organic peroxide may preferably be set to from 5/1 to 1/200, and more preferably from 1/10 to 1/20. Such a blending ratio makes it possible to provide ensuring of sealing properties and prevention of sealant flow in a better-balanced, compatible manner.

Examples of the organic peroxide include dicumyl peroxide, t-butyl cumyl peroxide, benzoyl peroxide, dibenzoyl peroxide, butyl hydroperoxide, p-chlorobenzoyl peroxide, 1,1,3,3-tetramethylbutyl hydroperoxide, and the like. In particular, organic peroxides having a 1-minute half-life temperature from 100° C. to 200° C. are preferable, and among the aforementioned specific examples, dicumyl peroxide and t-butyl cumyl peroxide are particularly preferable.

The sealant material composition according to an embodiment of the present technology is always blended with a liquid polymer. By blending the liquid polymer in this manner, the sealant material composition can have an increased viscosity and can provide improved sealing properties. The liquid polymer is blended in an amount from 10 parts by mass to 400 parts by mass, preferably from 50 parts by mass to 200 parts by mass, per 100 parts by mass of the rubber component described above. When the amount of the liquid polymer is less than 10 parts by mass, the effect of increasing the viscosity of the sealant material composition cannot be sufficiently obtained. When the amount of the liquid polymer exceeds 400 parts by mass, the sealant flow cannot be sufficiently prevented.

The liquid polymer is preferably a liquid rubber capable of co-crosslinking with the rubber component (butyl rubber) in the sealant material composition, and examples thereof include liquid butyl rubber, liquid isoprene rubber, liquid butadiene rubber, liquid styrene-butadiene rubber, and the like. Among these, liquid butyl rubber is particularly preferable.

The sealant material composition according to an embodiment of the present technology may also be blended with a vulcanization accelerator. By blending the vulcanization accelerator, the vulcanization rate can be increased, and the productivity of the sealant material composition can be enhanced. The amount of the vulcanization accelerator is preferably from 0.1 parts by mass to 10.0 parts by mass, and more preferably from 1.0 parts by mass to 5.0 parts by mass, per 100 parts by mass of the rubber component described above.

Examples of the vulcanization accelerator that can be used include guanidine accelerators, thiuram accelerators, dithiocarbamate accelerators, and thiazole accelerators. Examples of the guanidine vulcanization accelerator include diphenylguanidine, di-ortho-tolylguanidine, and the like. Examples of the thiuram vulcanization accelerator include tetramethylthiuram monosulfide, tetramethylthiuram disulfide, and the like. Examples of the dithiocarbamate vulcanization accelerator include sodium dimethyldithiocarbamate, sodium diethyldithiocarbamate, and the like. Examples of the thiazolevulcanization accelerator include 2-mercaptobenzothiazole, dibenzothiazyl disulfide, and the like. Among these, thiuram vulcanization accelerators are preferable and can suppress variations in the performance of the resulting sealant material composition. Among the thiuram vulcanization accelerators, tetramethyl thiuram disulfide is particularly suitable for high vulcanization accelerating effects.

The sealant material composition according to an embodiment of the present technology may also blended with carbon black. By blending with carbon black, the sealant material composition can provide improved fluidity. The carbon black is blended in an amount of preferably from 0.1 parts by mass to 20 parts by mass, more preferably from 5 parts by mass to 10 parts by mass, per 100 parts by mass of the rubber component described above. When the amount of the carbon black is less than 0.1 parts by mass, the effect of increasing the fluidity of the sealant material composition cannot be sufficiently obtained. When the amount of the carbon black exceeds 20 parts by mass, sealing properties may decline.

The sealant material composition according to an embodiment of the present technology contains a liquid polymer as described above to impart a reasonably high viscosity to the rubber component, and at the same time, uses a crosslinking agent and an organic peroxide in combination to perform crosslinking, so that the sealant material composition can obtain suitable elasticity that does not flow during traveling while ensuring sufficient viscosity to obtain good sealing properties. Thus, when the sealant material composition is adopted in the sealant layer of the self-sealing type pneumatic tire described below, excellent sealing properties can be exhibited without causing flow of the sealant layer in traveling conditions.

When the sealant material composition according to an embodiment of the present technology is produced, particularly when it includes carbon black as described above, a part of the rubber component, the crosslinking agent, and the carbon black are preferably kneaded before the organic peroxide, the liquid polymer, and the remaining rubber component are kneaded. Preferably an amount 30% by mass or less, and more preferably from 5% by mass to 10% by mass of the total amount of the rubber component may be charged as a part of the rubber component to be kneaded. Thus, by kneading a part of the rubber component, the crosslinking agent, and the carbon black beforehand, a crosslinking point can be adjusted to adjust the modulus of the sealant material composition into an appropriate range. By charging and kneading the organic peroxide, the liquid polymer, and the remaining rubber components therein, crosslinking can be performed using the crosslinking agent and the organic peroxide in combination while the viscosity of the sealant material composition is increased due to the blending of the liquid polymer. As a result, elasticity capable of sufficiently suppressing fluidity can be obtained while a suitable viscosity required to achieve good sealing properties is maintained, and these performances can be provided in a well-balanced, compatible manner. When kneading is performed in a different order (for example, when the crosslinking agent and the organic peroxide are mixed after the rubber component, the carbon black, and the liquid polymer are mixed), the modulus of the sealant material composition cannot be appropriately reduced, which makes it difficult to favorably exhibit followability of the sealant material with respect to deformation of the tire. Note that a part of the rubber component, the crosslinking agent, and the carbon black may be kneaded before the organic peroxide and the liquid polymer are kneaded, and accordingly, a part of the rubber component and the carbon black may be first kneaded and then the crosslinking agent may be added thereto and kneaded, followed by further adding and kneading the organic peroxide, the liquid polymer, and the remaining rubber component.

As illustrated in the drawing, the pneumatic tire according to an embodiment of the present technology includes a tread portion 1 having an annular shape extending in the tire circumferential direction, a pair of sidewall portions 2 disposed on both sides of the tread portion 1, and a pair of bead portions 3 disposed on an inner side of the sidewall portions 2 in the tire radial direction. Note that "CL" in the drawing denotes a tire equator. Additionally, the drawing is a meridian cross-sectional view, and accordingly, although not illustrated, each of the tread portion 1, the sidewall portion 2, and the bead portions 3 extends in the tire circumferential direction to form an annular shape. Thus, the basic structure of the toroidal shape of the pneumatic tire is configured. Other tire components in the meridian cross-sectional view are also formed in an annular shape extending in the tire circumferential direction unless otherwise indicated.

In the example of the drawing, a carcass layer 4 is mounted between the left-right pair of bead portions 3. The carcass layer 4 includes a plurality of reinforcing cords extending in the tire radial direction, and is folded back around a bead core 5 and a bead filler 6 disposed in each of the bead portions 3 from a vehicle inner side to a vehicle outer side. Additionally, the bead fillers 6 are disposed on the outer circumferential side of the bead cores 5, and each bead filler 6 is enveloped by a main body portion and a folded back portion of the carcass layer 4.

On the other hand, in the tread portion 1, a plurality of belt layers 7 (two layers in the drawing) are embedded on an outer circumferential side of the carcass layer 4. Of the plurality of belt layers 7, a layer having the smallest belt width is referred to as a minimum belt layer 7a, and a layer having the largest belt width is referred to as a maximum belt layer 7b. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7 in the tread portion 1. In the illustrated example, the belt reinforcing layer 8 has two layers provided: a full cover layer covering the entire width of the belt layers 7 and an edge cover layer disposed on the outer circumferential side of the full cover layer to cover only the end portions of the belt layers 7. The belt reinforcing layer 8 includes an organic fiber cord oriented in the tire circumferential direction, and an angle of the organic fiber cord with respect to the tire circumferential direction is set to, for example, from 0° to 5°.

Additionally, on a tire inner surface, an innerliner layer 9 is disposed along the carcass layer 4. This innerliner layer 9 is a layer for preventing air filled in the tire from passing out of the tire. The innerliner layer 9 is formed from a rubber composition based on butyl rubber having an air permeation preventing performance, for example. Alternatively, it may be formed of a resin layer having a thermoplastic resin as a matrix. In the case of the resin layer, an elastomer component may be dispersed in the matrix of the thermoplastic resin. Preferably, in order to improve adhesion to the sealant material composition according to an embodiment of the present technology described above, the innerliner layer 9 preferably contains a halogenated butyl rubber. The halogenated butyl rubber may preferably contain from 50 parts by mass to 100 parts by mass, and more preferably from 80 parts by mass to 100 parts by mass, in 100 parts by mass of the rubber component forming the innerliner layer 9. When the halogenated butyl rubber is contained, the halogenated butyl rubber, the halogenated butyl rubber contained in the sealant material composition, and the crosslinking aid are subjected to quinoid crosslinking to be bonded among these three, so that more excellent adhesion can be ensured.

As illustrated in the drawing, a sealant layer 10 is provided on the inner side of the innerliner layer 9 in the tire radial direction of the tread portion 1. The sealant material composition according to an embodiment of the present technology is used in the sealant layer 10. The sealant layer 10 is attached to the inner surface of a pneumatic tire having the basic structure described above, and for example, when foreign material such as a nail or the like penetrates into the tread portion 1, the sealant material that forms the sealant layer 10 flows into the through hole, which makes it possible to suppress reduction in air pressure and to maintain travel.

The sealant layer 10 has a thickness from 0.5 mm to 5.0 mm, for example. By having this degree of thickness, sealant flow can be suppressed in traveling conditions while good sealing properties are ensured. Furthermore, processability at the time of attaching the sealant layer 10 to the tire inner surface is also improved. When the thickness of the sealant layer 10 is less than 0.5 mm, it becomes difficult to ensure sufficient sealing properties. When the thickness of the sealant layer 10 exceeds 5.0 mm, the tire weight increases to degrade rolling resistance. Note that the sealant layer 10 has an average thickness.

The sealant layer 10 can be formed by being attached to the inner surface of the vulcanized pneumatic tire later. For example, the sealant layer 10 can be formed by attaching a sheet-like molded sealant material made of a sealant material composition described below entirely around the circumference of a tire inner surface, or by spirally attaching a string-like or band-like molded sealant material made of a sealant material composition described below to the tire inner surface. In addition, by heating the sealant material composition at this time, variations in the performance of the sealant material composition can be suppressed. The heating conditions are preferably at a temperature from 140° C. to 180° C., more preferably from 160° C. to 180° C., and for a heating time of preferably from 5 minutes to 30 minutes, more preferably from 10 minutes to 20 minutes. According to the method for manufacturing a pneumatic tire, a pneumatic tire having excellent sealing properties when punctured and that is not prone to cause sealant flow can be efficiently manufactured.

The sealant layer 10 is preferably provided at a substantially center position in the tire lateral direction in consideration of the impact on the uniformity of the pneumatic tire. In other words, the center position of the sealant layer 10 in the tire lateral direction is preferably disposed in a range of ±10 mm in the tire lateral direction from a tire equator CL. When the center position of the sealant layer 10 in the tire lateral direction deviates from this range, the sealant layer 10 is provided offset in the tire lateral direction, which reduces the uniformity of the pneumatic tire.

Furthermore, the end portion of the sealant layer 10 in the tire lateral direction is preferably disposed near the end portion of the belt layer 7. Specifically, when the distance from the tire equator CL to the end portion of the minimum belt layer 7a is La, the distance from the tire equator CL to the end portion of the maximum belt layer 7b is Lb, and the distance from the tire equator CL to the end portion of the sealant layer 10 in the tire lateral direction is Lc, the distances La, Lb, Lc preferably satisfy the relationship La≤Lc≤1.05×Lb. Thus, flow at the end portion of the sealant layer 10 can be effectively suppressed while sealing properties are ensured with the sealant layer 10 covering the appropriate range. When the relationship between these distances is Lc<La, the region where the sealant layer 10 does not exist increases, making it difficult to ensure sufficient sealing properties near the end portion of the belt layer 7. When the relationship between these distances is Lc>1.05×Lb, the sealant layer 10 reaches near the sidewall portion 2 which is greatly deformed during traveling, and the flow in the tire equator CL direction of the sealant layer 10 is more likely to be induced due to the effects of softening caused by heat generated during traveling and centrifugal force.

The present technology is further explained below by examples. However, the scope of the present technology is not limited to these examples.

EXAMPLES

Tires according to Comparative Examples 1 to 9 and according to Examples 1 to 45 were manufactured. The pneumatic tires have a tire size of 215/60R16, have a basic structure illustrated in the drawing, and include a sealant layer formed on sealant on an inner side of an innerliner layer in a tire radial direction of a tread portion. The tires are adjusted for composition of the sealant material composition that forms the sealant layer, kneading order of components of the sealant material composition, the amount of rubber component to be charged, thickness of the sealant layer in the pneumatic tire, and distance from the tire equator at the center position of the sealant layer as indicated in Tables 1 to 6.

Note that in any examples, the innerliner layer was formed from a halogenated butyl rubber. The "kneading order" rows of Tables 1 to 6 listed any of the three kneading orders (A to C) indicated in Table 7.

Sealing properties evaluated under three conditions (conditions 1 to 3), sealant fluidity, and low rolling performance for these test tires were evaluated according to the following test methods, and the results were indicated in Tables 1 to 6.

Sealing Properties (Condition 1)

The test tires were assembled on wheels having a rim size of 16×6.5 j, mounted on a test vehicle, with an initial air pressure of 250 kPa, a load of 8.5 kN and a traveling speed of 80 km/h and traveled for 1 hour with a 4 mm-diameter nail driven into the tread portion, and then the air pressure was measured. The evaluation results were indicated by "excellent" in a case where the air pressure after traveling was at least 230 kPa and at most 250 kPa; by "good" in a case where the air pressure after traveling was at least 200 kPa and less than 230 kPa; and by "fail" in a case where the air pressure after traveling was less than 200 kPa.

Sealing Properties (Condition 2)

The test tires were assembled on wheels having a rim size of 16×6.5 j, mounted on a test vehicle, with an initial air pressure of 250 kPa and a load of 8.5 kN, a 4 mm-diameter nail was driven into the tread portion, and then the test tire was left to stand for one hour in a state in which the nail was removed. Thereafter, the air pressure was measured. The evaluation results were expressed in the following five levels.

5: Air pressure after the standing was at least 240 kPa and at most 250 kPa

4: Air pressure after the standing was at least 230 kPa and less than 240 kPa

3: Air pressure after the standing was at least 220 kPa and less than 230 kPa

2: Air pressure after the standing was at least 200 kPa and less than 220 kPa

1: Air pressure after the standing was less than 200 kPa

Sealing Properties (Condition 3)

The test tires were assembled on wheels having a rim size of 16×6.5 j, mounted on a test vehicle, with an initial air pressure of 250 kPa and a load of 8.5 kN, a 4 mm-diameter nail was driven into the tread portion, and then the test tire was traveled for 2 hours in a state in which the nail was removed at a traveling speed of 80 km/h. Thereafter, the air pressure was measured. The evaluation results were expressed in the following five levels.

5: Air pressure after the standing was at least 240 kPa and at most 250 kPa

4: Air pressure after the standing was at least 230 kPa and less than 240 kPa

3: Air pressure after the standing was at least 220 kPa and less than 230 kPa

2: Air pressure after the standing was at least 200 kPa and less than 220 kPa

1: Air pressure after the standing was less than 200 kPa

Sealant Fluidity

The test tires were assembled on wheels having a rim size of 16×6.5 j, mounted on a drum testing machine, and subjected to high deflection test with an air pressure of 160 kPa, a load of 8.5 kN, and a traveling speed of 80 km/h for 80 hours, and then the flow state of the sealant was examined. When the region from the tire equator position to the outer end position of the sealant layer in the tire lateral direction was divided into quarters, the evaluation results were indicated by "excellent" in a case where no sealant flow was observed, by "good" in a case where sealant flow occurred in a region less than a quarter of the total region, and by "fail" in a case where sealant flow occurred in a region at least a quarter of the total region.

Low Rolling Performance

Each test tire was mounted on a wheel having a rim size of 16×6.5 J, with an air pressure of 160 kPa, using an indoor drum testing machine (drum diameter: 1707 mm), and traveled at a speed of 80 km/h while pushed against the drum under a load equivalent to 85% of the maximum load at the air pressure described in the 2009 JATMA (The Japan Automobile Tyre Manufacturers Association, Inc.) Year Book. At this time, the rolling resistance was measured. The evaluation results were expressed as index values corresponding to reciprocals of measurement values, with Comparative Example 1 being assigned the value of 100. A larger index value indicates lower rolling resistance and excellent low rolling performance.

TABLE 1

|  |  |  | Comparative Example 1 | Comparative Example 2 | Comparative Example 3 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 0.1 |  | 0.1 |
|  | Crosslinking agent 2 | Parts by mass |  |  |  |
|  | Organic peroxide 1 | Parts by mass |  | 0.1 | 0.1 |
|  | Organic peroxide 2 | Parts by mass |  |  |  |

TABLE 1-continued

|  |  |  |  |  |  |
|---|---|---|---|---|---|
|  | Organic peroxide 3 | Parts by mass |  |  |  |
|  | Organic peroxide 4 | Parts by mass |  |  |  |
|  | Ratio A/B |  | 1/1 | — | 1/1 |
|  | Vulcanization accelerator 1 | Parts by mass |  |  |  |
|  | Vulcanization accelerator 2 | Parts by mass | 20 | 20 | 20 |
|  | Carbon black | Parts by mass | 10 | 10 | 10 |
|  | Liquid polymer | Parts by mass | 200 | 200 |  |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Excellent | Fail | Excellent |
|  | Sealing properties (condition 2) |  | 5 | 1 | 4 |
|  | Sealing properties (condition 3) |  | 5 | 1 | 4 |
|  | Sealant fluidity |  | Fail | Fail | Fail |
|  | Low rolling resistance | Index value | 100 | 100 | 100 |

|  |  |  | Example 1 | Example 2 | Example 3 | Example 4 |
|---|---|---|---|---|---|---|
| Sealant material composition | Butyl rubber | Parts by mass | 100 | 100 | 100 | 100 |
|  | Halogenated butyl rubber | Parts by mass |  |  |  |  |
|  | Natural rubber | Parts by mass |  |  |  |  |
|  | Crosslinking agent 1 | Parts by mass | 0.1 | 0.1 | 0.1 | 0.1 |
|  | Crosslinking agent 2 | Parts by mass |  |  |  |  |
|  | Organic peroxide 1 | Parts by mass | 0.1 | 20 | 40 |  |
|  | Organic peroxide 2 | Parts by mass |  |  |  | 0.1 |
|  | Organic peroxide 3 | Parts by mass |  |  |  |  |
|  | Organic peroxide 4 | Parts by mass |  |  |  |  |
|  | Ratio A/B |  | 1/1 | 1/200 | 1/400 | 1/1 |
|  | Vulcanization accelerator 1 | Parts by mass |  |  |  |  |
|  | Vulcanization accelerator 2 | Parts by mass | 20 | 20 | 20 | 20 |
|  | Carbon black | Parts by mass | 10 | 10 | 10 | 10 |
|  | Liquid polymer | Parts by mass | 200 | 200 | 200 | 200 |
| Kneading | Kneading order |  | A | A | A | A |
|  | Rubber component to be charged | Parts by mass | 10 | 10 | 10 | 10 |
| Tire | Thickness of sealant layer | mm | 2.5 | 2.5 | 2.5 | 2.5 |
|  | Center position of sealant layer | mm | 0 | 0 | 0 | 0 |
|  | Sealing properties (condition 1) |  | Excellent | Excellent | Good | Excellent |
|  | Sealing properties (condition 2) |  | 5 | 5 | 3 | 5 |
|  | Sealing properties (condition 3) |  | 5 | 5 | 3 | 5 |
|  | Sealant fluidity |  | Excellent | Excellent | Excellent | Excellent |
|  | Low rolling resistance | Index value | 100 | 100 | 100 | 100 |

|  |  |  | Example 5 | Example 6 | Example 7 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 0.1 | 0.1 | 10 |
|  | Crosslinking agent 2 | Parts by mass |  |  | 10 |
|  | Organic peroxide 1 | Parts by mass |  |  |  |
|  | Organic peroxide 2 | Parts by mass | 20 | 40 |  |
|  | Organic peroxide 3 | Parts by mass |  |  |  |
|  | Organic peroxide 4 | Parts by mass |  |  |  |
|  | Ratio A/B |  | 1/200 | 1/400 | 1/1 |
|  | Vulcanization accelerator 1 | Parts by mass |  |  |  |
|  | Vulcanization accelerator 2 | Parts by mass | 20 | 20 | 20 |
|  | Carbon black | Parts by mass | 10 | 10 | 10 |
|  | Liquid polymer | Parts by mass | 200 | 200 | 200 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |

TABLE 1-continued

|  |  |  |  |
|---|---|---|---|
| Sealing properties (condition 1) | Excellent | Excellent | Excellent |
| Sealing properties (condition 2) | 5 | 4 | 4 |
| Sealing properties (condition 3) | 5 | 4 | 4 |
| Sealant fluidity | Excellent | Excellent | Excellent |
| Low rolling resistance   Index value | 100 | 100 | 100 |

TABLE 2

|  |  |  | Example 8 | Example 9 | Comparative Example 4 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 10 | 10 | 10 |
|  | Crosslinking agent 2 | Parts by mass |  |  |  |
|  | Organic peroxide 1 | Parts by mass | 20 | 40 | 50 |
|  | Organic peroxide 2 | Parts by mass |  |  |  |
|  | Organic peroxide 3 | Parts by mass |  |  |  |
|  | Organic peroxide 4 | Parts by mass |  |  |  |
|  | Ratio A/B |  | 1/2 | 1/4 | 1/5 |
|  | Vulcanization accelerator 1 | Parts by mass |  |  |  |
|  | Vulcanization accelerator 2 | Parts by mass | 20 | 20 | 20 |
|  | Carbon black | Parts by mass | 10 | 10 | 10 |
|  | Liquid polymer | Parts by mass | 200 | 200 | 200 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Excellent | Good | Fail |
|  | Sealing properties (condition 2) |  | 5 | 3 | 1 |
|  | Sealing properties (condition 3) |  | 5 | 3 | 1 |
|  | Sealant fluidity |  | Excellent | Excellent | Excellent |
|  | Low rolling resistance   Index value |  | 100 | 100 | 100 |

|  |  |  | Example 10 | Example 11 | Example 12 | Example 13 |
|---|---|---|---|---|---|---|
| Sealant material composition | Butyl rubber | Parts by mass | 100 | 100 | 100 | 100 |
|  | Halogenated butyl rubber | Parts by mass |  |  |  |  |
|  | Natural rubber | Parts by mass |  |  |  |  |
|  | Crosslinking agent 1 | Parts by mass | 20 | 20 | 20 | 20 |
|  | Crosslinking agent 2 | Parts by mass |  |  |  |  |
|  | Organic peroxide 1 | Parts by mass | 4 | 10 | 20 | 40 |
|  | Organic peroxide 2 | Parts by mass |  |  |  |  |
|  | Organic peroxide 3 | Parts by mass |  |  |  |  |
|  | Organic peroxide 4 | Parts by mass |  |  |  |  |
|  | Ratio A/B |  | 5/1 | 2/1 | 1/1 | 1/2 |
|  | Vulcanization accelerator 1 | Parts by mass |  |  |  |  |
|  | Vulcanization accelerator 2 | Parts by mass | 20 | 20 | 20 | 20 |
|  | Carbon black | Parts by mass | 10 | 10 | 10 | 10 |
|  | Liquid polymer | Parts by mass | 200 | 200 | 200 | 200 |
| Kneading | Kneading order |  | A | A | A | A |
|  | Rubber component to be charged | Parts by mass | 10 | 10 | 10 | 10 |
| Tire | Thickness of sealant layer | mm | 2.5 | 2.5 | 2.5 | 2.5 |
|  | Center position of sealant layer | mm | 0 | 0 | 0 | 0 |
|  | Sealing properties (condition 1) |  | Excellent | Excellent | Excellent | Excellent |
|  | Sealing properties (condition 2) |  | 3 | 5 | 5 | 4 |
|  | Sealing properties (condition 3) |  | 3 | 5 | 5 | 4 |
|  | Sealant fluidity |  | Excellent | Excellent | Excellent | Excellent |
|  | Low rolling resistance   Index value |  | 100 | 100 | 100 | 100 |

TABLE 2-continued

|  |  |  | Example 14 | Example 15 | Example 16 |
|---|---|---|---|---|---|
| Sealant material composition | Butyl rubber | Parts by mass |  | 100 | 100 |
|  | Halogenated butyl rubber | Parts by mass | 100 |  |  |
|  | Natural rubber | Parts by mass |  |  |  |
|  | Crosslinking agent 1 | Parts by mass | 20 | 20 | 20 |
|  | Crosslinking agent 2 | Parts by mass |  |  |  |
|  | Organic peroxide 1 | Parts by mass | 20 |  |  |
|  | Organic peroxide 2 | Parts by mass |  | 10 | 20 |
|  | Organic peroxide 3 | Parts by mass |  |  |  |
|  | Organic peroxide 4 | Parts by mass |  |  |  |
|  | Ratio A/B |  | 5/1 | 2/1 | 1/1 |
|  | Vulcanization accelerator 1 | Parts by mass |  |  |  |
|  | Vulcanization accelerator 2 | Parts by mass | 20 | 20 | 20 |
|  | Carbon black | Parts by mass | 10 | 10 | 10 |
|  | Liquid polymer | Parts by mass | 200 | 200 | 200 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Excellent | Excellent | Excellent |
|  | Sealing properties (condition 2) |  | 4 | 5 | 5 |
|  | Sealing properties (condition 3) |  | 4 | 5 | 5 |
|  | Sealant fluidity |  | Excellent | Good | Excellent |
|  | Low rolling resistance | Index value | 100 | 100 | 100 |

TABLE 3

|  |  |  | Example 17 | Comparative Example 5 | Example 18 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 20 | 30 | 20 |
|  | Crosslinking agent 2 | Parts by mass |  |  |  |
|  | Organic peroxide 1 | Parts by mass |  | 20 | 20 |
|  | Organic peroxide 2 | Parts by mass | 40 |  |  |
|  | Organic peroxide 3 | Parts by mass |  |  |  |
|  | Organic peroxide 4 | Parts by mass |  |  |  |
|  | Ratio A/B |  | 1/2 | 3/2 | 1/1 |
|  | Vulcanization accelerator 1 | Parts by mass |  |  |  |
|  | Vulcanization accelerator 2 | Parts by mass | 20 | 20 | 20 |
|  | Carbon black | Parts by mass | 10 | 10 | 10 |
|  | Liquid polymer | Parts by mass | 200 | 200 | 10 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Excellent | Excellent | Excellent |
|  | Sealing properties (condition 2) |  | 5 | 5 | 5 |
|  | Sealing properties (condition 3) |  | 5 | 5 | 5 |
|  | Sealant fluidity |  | Excellent | Fail | Excellent |
|  | Low rolling resistance | Index value | 100 | 100 | 100 |

|  |  |  | Example 19 | Example 20 | Comparative Example 6 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 20 | 20 | 10 |
|  | Crosslinking agent 2 | Parts by mass |  |  |  |
|  | Organic peroxide 1 | Parts by mass | 20 | 20 | 10 |

TABLE 3-continued

|  |  |  |  |  |  |
|---|---|---|---|---|---|
|  | Organic peroxide 2 | Parts by mass |  |  |  |
|  | Organic peroxide 3 | Parts by mass |  |  |  |
|  | Organic peroxide 4 | Parts by mass |  |  |  |
|  | Ratio A/B |  | 1/1 | 1/1 | 1/1 |
|  | Vulcanization accelerator 1 | Parts by mass |  |  |  |
|  | Vulcanization accelerator 2 | Parts by mass | 20 | 20 | 20 |
|  | Carbon black | Parts by mass | 10 | 10 | 10 |
|  | Liquid polymer | Parts by mass | 100 | 400 | 500 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Excellent | Good | Fail |
|  | Sealing properties (condition 2) |  | 5 | 3 | 1 |
|  | Sealing properties (condition 3) |  | 5 | 3 | 1 |
|  | Sealant fluidity |  | Excellent | Excellent | Excellent |
|  | Low rolling resistance | Index value | 100 | 100 | 100 |

|  |  |  | Example 21 | Example 22 | Example 23 | Example 24 |
|---|---|---|---|---|---|---|
| Sealant material composition | Butyl rubber | Parts by mass | 100 | 100 | 100 | 100 |
|  | Halogenated butyl rubber | Parts by mass |  |  |  |  |
|  | Natural rubber | Parts by mass |  |  |  |  |
|  | Crosslinking agent 1 | Parts by mass | 20 | 20 | 20 | 20 |
|  | Crosslinking agent 2 | Parts by mass |  |  |  |  |
|  | Organic peroxide 1 | Parts by mass | 20 | 20 | 20 | 20 |
|  | Organic peroxide 2 | Parts by mass |  |  |  |  |
|  | Organic peroxide 3 | Parts by mass |  |  |  |  |
|  | Organic peroxide 4 | Parts by mass |  |  |  |  |
|  | Ratio A/B |  | 1/1 | 1/1 | 1/1 | 1/1 |
|  | Vulcanization accelerator 1 | Parts by mass |  |  |  |  |
|  | Vulcanization accelerator 2 | Parts by mass | 20 | 20 | 20 | 20 |
|  | Carbon black | Parts by mass | 20 | 10 | 0.5 |  |
|  | Liquid polymer | Parts by mass |  |  |  | 400 |
| Kneading | Kneading order |  | A | A | A | C |
|  | Rubber component to be charged | Parts by mass | 10 | 10 | 10 | 10 |
| Tire | Thickness of sealant layer | mm | 2.5 | 2.5 | 2.5 | 2.5 |
|  | Center position of sealant layer | mm | 0 | 0 | 0 | 0 |
|  | Sealing properties (condition 1) |  | Good | Excellent | Excellent | Excellent |
|  | Sealing properties (condition 2) |  | 3 | 5 | 5 | 5 |
|  | Sealing properties (condition 3) |  | 3 | 5 | 5 | 5 |
|  | Sealant fluidity |  | Excellent | Excellent | Excellent | Excellent |
|  | Low rolling resistance | Index value | 100 | 100 | 100 | 100 |

TABLE 4

|  |  |  | Example 25 | Example 26 | Example 27 | Example 28 |
|---|---|---|---|---|---|---|
| Sealant material composition | Butyl rubber | Parts by mass | 100 | 100 | 100 | 100 |
|  | Halogenated butyl rubber | Parts by mass |  |  |  |  |
|  | Natural rubber | Parts by mass |  |  |  |  |
|  | Crosslinking agent 1 | Parts by mass | 20 | 20 | 20 | 20 |
|  | Crosslinking agent 2 | Parts by mass |  |  |  |  |
|  | Organic peroxide 1 | Parts by mass | 20 |  |  |  |
|  | Organic peroxide 2 | Parts by mass |  | 20 |  |  |
|  | Organic peroxide 3 | Parts by mass |  |  | 20 |  |
|  | Organic peroxide 4 | Parts by mass |  |  |  | 20 |
|  | Ratio A/B |  | 1/1 | 1/1 | 1/1 | 1/1 |
|  | Vulcanization accelerator 1 | Parts by mass | 20 | 20 | 20 | 20 |
|  | Vulcanization accelerator 2 | Parts by mass |  |  |  |  |
|  | Carbon black | Parts by mass | 10 | 10 | 10 | 10 |
|  | Liquid polymer | Parts by mass | 200 | 200 | 200 | 200 |

TABLE 4-continued

|  |  |  |  |  |  |  |
|---|---|---|---|---|---|---|
| Kneading |  | Kneading order | A | A | A | A |
|  | Rubber component to be charged | Parts by mass | 10 | 10 | 10 | 10 |
| Tire | Thickness of sealant layer | mm | 2.5 | 2.5 | 2.5 | 2.5 |
|  | Center position of sealant layer | mm | 0 | 0 | 0 | 0 |
|  | Sealing properties (condition 1) |  | Excellent | Excellent | Excellent | Excellent |
|  | Sealing properties (condition 2) |  | 5 | 5 | 5 | 5 |
|  | Sealing properties (condition 3) |  | 5 | 5 | 5 | 5 |
|  | Sealant fluidity |  | Excellent | Excellent | Excellent | Excellent |
|  | Low rolling resistance | Index value | 100 | 100 | 100 | 100 |

|  |  |  | Example 29 | Example 30 | Example 31 | Example 32 |
|---|---|---|---|---|---|---|
| Sealant material composition | Butyl rubber | Parts by mass | 100 | 100 | 100 | 100 |
|  | Halogenated butyl rubber | Parts by mass |  |  |  |  |
|  | Natural rubber | Parts by mass |  |  |  |  |
|  | Crosslinking agent 1 | Parts by mass | 20 | 20 | 20 | 20 |
|  | Crosslinking agent 2 | Parts by mass |  |  |  |  |
|  | Organic peroxide 1 | Parts by mass | 20 | 20 | 20 | 20 |
|  | Organic peroxide 2 | Parts by mass |  |  |  |  |
|  | Organic peroxide 3 | Parts by mass |  |  |  |  |
|  | Organic peroxide 4 | Parts by mass |  |  |  |  |
|  | Ratio A/B |  | 5/1 | 5/1 | 5/1 | 5/1 |
|  | Vulcanization accelerator 1 | Parts by mass |  |  |  |  |
|  | Vulcanization accelerator 2 | Parts by mass | 20 | 20 | 20 | 20 |
|  | Carbon black | Parts by mass | 10 | 10 | 10 | 10 |
|  | Liquid polymer | Parts by mass | 200 | 200 | 200 | 200 |
| Kneading |  | Kneading order | A | A | A | A |
|  | Rubber component to be charged | Parts by mass | 10 | 10 | 10 | 10 |
| Tire | Thickness of sealant layer | mm | 0.5 | 5 | 2.5 | 2.5 |
|  | Center position of sealant layer | mm | 0 | 0 | 5 | 10 |
|  | Sealing properties (condition 1) |  | Excellent | Excellent | Excellent | Excellent |
|  | Sealing properties (condition 2) |  | 5 | 5 | 5 | 5 |
|  | Sealing properties (condition 3) |  | 5 | 5 | 5 | 5 |
|  | Sealant fluidity |  | Excellent | Excellent | Excellent | Excellent |
|  | Low rolling resistance | Index value | 100 | 100 | 100 | 100 |

TABLE 5

|  |  |  | Example 33 | Example 34 | Example 35 | Example 36 |
|---|---|---|---|---|---|---|
| Sealant material composition | Butyl rubber | Parts by mass | 100 |  | 100 |  |
|  | Halogenated butyl rubber | Parts by mass |  |  |  |  |
|  | Natural rubber | Parts by mass |  | 100 |  | 100 |
|  | Crosslinking agent 1 | Parts by mass | 5 |  | 5 |  |
|  | Crosslinking agent 2 | Parts by mass |  | 5 |  | 5 |
|  | Organic peroxide 1 | Parts by mass | 10 | 10 | 10 | 10 |
|  | Organic peroxide 2 | Parts by mass |  |  |  |  |
|  | Organic peroxide 3 | Parts by mass |  |  |  |  |
|  | Organic peroxide 4 | Parts by mass |  |  |  |  |
|  | Ratio A/B |  | 1/2 | 1/2 | 1/2 | 1/2 |
|  | Vulcanization accelerator 1 | Parts by mass | 20 | 20 | 20 | 20 |
|  | Vulcanization accelerator 2 | Parts by mass |  |  |  |  |
|  | Carbon black | Parts by mass | 10 | 10 | 10 | 10 |
|  | Liquid polymer | Parts by mass | 200 | 200 | 200 | 200 |
| Kneading |  | Kneading order | A | A | A | A |
|  | Rubber component to be charged | Parts by mass | 10 | 10 | 30 | 30 |
| Tire | Thickness of sealant layer | mm | 2.5 | 2.5 | 2.5 | 2.5 |
|  | Center position of sealant layer | mm | 0 | 0 | 0 | 0 |

TABLE 5-continued

| | | | | | | |
|---|---|---|---|---|---|---|
| Sealing properties (condition 1) | | | Excellent | Excellent | Excellent | Excellent |
| Sealing properties (condition 2) | | | 5 | 5 | 5 | 5 |
| Sealing properties (condition 3) | | | 5 | 5 | 5 | 5 |
| Sealant fluidity | | | Excellent | Excellent | Excellent | Excellent |
| Low rolling resistance | Index value | | 100 | 100 | 100 | 100 |

| | | | Example 37 | Example 38 | Comparative Example 7 |
|---|---|---|---|---|---|
| Sealant material composition | Butyl rubber | Parts by mass | 100 | | 100 |
| | Halogenated butyl rubber | Parts by mass | | | |
| | Natural rubber | Parts by mass | | 100 | |
| | Crosslinking agent 1 | Parts by mass | 5 | | |
| | Crosslinking agent 2 | Parts by mass | | 5 | |
| | Organic peroxide 1 | Parts by mass | 10 | 10 | 10 |
| | Organic peroxide 2 | Parts by mass | | | |
| | Organic peroxide 3 | Parts by mass | | | |
| | Organic peroxide 4 | Parts by mass | | | |
| | Ratio A/B | | 1/2 | 1/2 | — |
| | Vulcanization accelerator 1 | Parts by mass | 20 | 20 | 20 |
| | Vulcanization accelerator 2 | Parts by mass | | | |
| | Carbon black | Parts by mass | 10 | 10 | 10 |
| | Liquid polymer | Parts by mass | 200 | 200 | 200 |
| Kneading | Kneading order | | B | B | A |
| | Rubber component to be charged | Parts by mass | — | — | 10 |
| Tire | Thickness of sealant layer | mm | 2.5 | 2.5 | 2.5 |
| | Center position of sealant layer | mm | 0 | 0 | 0 |
| | Sealing properties (condition 1) | | Excellent | Excellent | Excellent |
| | Sealing properties (condition 2) | | 5 | 5 | 5 |
| | Sealing properties (condition 3) | | 5 | 5 | 5 |
| | Sealant fluidity | | Excellent | Excellent | Fail |
| | Low rolling resistance | Index value | 100 | 100 | 100 |

| | | | Example 39 | Example 40 | Comparative Example 8 |
|---|---|---|---|---|---|
| Sealant material composition | Butyl rubber | Parts by mass | 100 | 100 | 100 |
| | Halogenated butyl rubber | Parts by mass | | | |
| | Natural rubber | Parts by mass | | | |
| | Crosslinking agent 1 | Parts by mass | 0.1 | 5 | |
| | Crosslinking agent 2 | Parts by mass | | | |
| | Organic peroxide 1 | Parts by mass | 10 | 10 | 10 |
| | Organic peroxide 2 | Parts by mass | | | |
| | Organic peroxide 3 | Parts by mass | | | |
| | Organic peroxide 4 | Parts by mass | | | |
| | Ratio A/B | | 1/2 | 1/2 | — |
| | Vulcanization accelerator 1 | Parts by mass | 20 | 20 | 20 |
| | Vulcanization accelerator 2 | Parts by mass | | | |
| | Carbon black | Parts by mass | | | |
| | Liquid polymer | Parts by mass | 200 | 200 | 200 |
| Kneading | Kneading order | | C | C | C |
| | Rubber component to be charged | Parts by mass | 10 | 10 | 10 |
| Tire | Thickness of sealant layer | mm | 2.5 | 2.5 | 2.5 |
| | Center position of sealant layer | mm | 0 | 0 | 0 |
| | Sealing properties (condition 1) | | Excellent | Excellent | Excellent |
| | Sealing properties (condition 2) | | 5 | 5 | 5 |
| | Sealing properties (condition 3) | | 5 | 5 | 5 |
| | Sealant fluidity | | Excellent | Excellent | Fail |
| | Low rolling resistance | Index value | 100 | 100 | 100 |

TABLE 6

|  |  |  | Comparative Example 9 | Example 41 | Example 42 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 5 | 5 | 5 |
|  | Crosslinking agent 2 | Parts by mass |  |  |  |
|  | Organic peroxide 1 | Parts by mass |  | 10 | 10 |
|  | Organic peroxide 2 | Parts by mass |  |  |  |
|  | Organic peroxide 3 | Parts by mass |  |  |  |
|  | Organic peroxide 4 | Parts by mass |  |  |  |
|  | Ratio A/B |  | — | 1/2 | 1/2 |
|  | Vulcanization accelerator 1 | Parts by mass | 20 | 20 |  |
|  | Vulcanization accelerator 2 | Parts by mass |  |  | 20 |
|  | Carbon black | Parts by mass | 10 | 10 | 10 |
|  | Liquid polymer | Parts by mass | 200 |  | 200 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Fail | Excellent | Excellent |
|  | Sealing properties (condition 2) |  | 1 | 5 | 5 |
|  | Sealing properties (condition 3) |  | 1 | 5 | 5 |
|  | Sealant fluidity |  | Excellent | Excellent | Excellent |
|  | Low rolling resistance | Index value | 100 | 100 | 100 |

|  |  |  | Example 43 | Example 44 | Example 45 |
|---|---|---|---|---|---|
| Sealant material composition | Butyl rubber | Parts by mass | 100 | 100 | 100 |
|  | Halogenated butyl rubber | Parts by mass |  |  |  |
|  | Natural rubber | Parts by mass |  |  |  |
|  | Crosslinking agent 1 | Parts by mass | 5 | 5 | 5 |
|  | Crosslinking agent 2 | Parts by mass |  |  |  |
|  | Organic peroxide 1 | Parts by mass |  |  |  |
|  | Organic peroxide 2 | Parts by mass | 10 |  |  |
|  | Organic peroxide 3 | Parts by mass |  | 10 |  |
|  | Organic peroxide 4 | Parts by mass |  |  | 10 |
|  | Ratio A/B |  | 1/2 | 1/2 | 1/2 |
|  | Vulcanization accelerator 1 | Parts by mass | 20 | 20 | 20 |
|  | Vulcanization accelerator 2 | Parts by mass |  |  |  |
|  | Carbon black | Parts by mass | 10 | 10 | 10 |
|  | Liquid polymer | Parts by mass | 200 | 200 | 200 |
| Kneading | Kneading order |  | A | A | A |
|  | Rubber component to be charged | Parts by mass | 10 | 10 | 10 |
| Tire | Thickness of sealant layer | mm | 2.5 | 2.5 | 2.5 |
|  | Center position of sealant layer | mm | 0 | 0 | 0 |
|  | Sealing properties (condition 1) |  | Excellent | Excellent | Excellent |
|  | Sealing properties (condition 2) |  | 5 | 5 | 5 |
|  | Sealing properties (condition 3) |  | 5 | 5 | 5 |
|  | Sealant fluidity |  | Excellent | Excellent | Excellent |
|  | Low rolling resistance | Index value | 100 | 100 | 100 |

TABLE 7

|  | Kneading order | | |
|---|---|---|---|
|  | A | B | C |
| First charging | (A part of) rubber component<br>Carbon black | (A part of) rubber component<br>Carbon black | (A part of) rubber component |
| Kneading time T (minutes) | 10 | 10 | 10 |

TABLE 7-continued

|  | Kneading order | | |
|---|---|---|---|
|  | A | B | C |
| Second charging | Crosslinking agent | (Remaining) rubber component Liquid polymer | Crosslinking agent |
| Kneading time T (minutes) | 10 | 10 | 10 |
| Third charging | (Remaining) rubber component Liquid polymer Organic peroxide | Crosslinking agent Organic peroxide | (Remaining) rubber component Liquid polymer Organic peroxide |
| Kneading time T (minutes) | 10 | 10 | 10 |

Types of raw materials used as indicated in Tables 1 to 6 are described below.

Butyl rubber: BUTYL 268, available from JSR

Halogenated butyl rubber: BROMOBUTYL 2222, available from JSR

Natural rubber: RSS #3

Crosslinking agent 1: Sulfur, small lumps of sulfur, available from Hosoi Chemical Industry Co., Ltd.

Crosslinking agent 2: Quinone dioxime, VALNOC GM, available from Ouchi Shinko Chemical Industrial Co., Ltd.

Organic peroxide 1: Dicumyl peroxide, Percumyl D-40, available from NOF Corp. (1-minute half-life temperature: 179° C.)

Organic peroxide 2: Dibenzoyl peroxide, NYPER NS, available from NOF Corp. (1-minute half-life temperature: 133° C.)

Organic peroxide 3: Diisopropylbenzene hydroperoxide, PERCUMYL P, available from NOF Corp. (1-minute half-life temperature: 232° C.)

Organic peroxide 4: Cumyl peroxyneodecanoate, PERCUMYL ND, available from NOF Corp. (1-minute half-life temperature: 94° C.)

Vulcanization accelerator 1: Thiuram vulcanization accelerator, NOCCELER DM-PO, available from Ouchi Shinko Chemical Industrial Co., Ltd.

Vulcanization accelerator 2: Guanidine vulcanization accelerator, NOCCELER D, available from Ouchi Shinko Chemical Industrial Co., Ltd.

Carbon black: SEAST 300, available from Tokai Carbon Co., Ltd.

Liquid polymer: Liquid butyl, Kalene 800, available from Royal Elastomers

As is clear from Tables 1 to 6, the pneumatic tires of Examples 1 to 45 have improved sealing properties and sealant fluidity with respect to the pneumatic tire of Comparative Example 1. In particular, in each example using organic peroxides 1, 2 having a 1-minute half-life temperature within a range from 100° C. to 200° C., variations in the performance of the sealant material composition have been able to be suppressed, compared to those in Examples 27, 28 using organic peroxides 3, 4 having a 1-minute half-life temperature outside the range from 100° C. to 200° C. Furthermore, each example of the sealant material composition produced by the preferred kneading method has been able to exhibit excellent sealing properties even under more harsh conditions.

On the other hand, in Comparative Examples 1, 9, the sealant material composition did not include an organic peroxide, and thus the sealant fluidity has failed to be suppressed. In Comparative Examples 2, 7, 8, because the sealant material composition did not include a crosslinking agent, adequate sealing properties has failed to be obtained, and the sealant fluidity has failed to be suppressed. In Comparative Example 3, because the sealant material composition did not include a liquid polymer, the sealant fluidity has failed to be suppressed. In Comparative Example 4, because the amount of the organic peroxide blended in the sealant material composition was too high, the appropriate sealing properties have failed to be obtained. In Comparative Example 5, because the amount of the crosslinking agent blended in the sealant material composition was too high, the sealant fluidity has failed to be suppressed. In Comparative Example 6, because the amount of the liquid polymer blended in the sealant material composition was too high, the appropriate sealing properties have failed to be obtained.

The invention claimed is:

1. A pneumatic tire comprising: a tread portion having an annular shape extending in a tire circumferential direction; a pair of sidewall portions disposed on both sides of the tread portion; and a pair of bead portions disposed on an inner side of the sidewall portions in a tire outer diameter direction, and having at least a sealant layer made of a sealant material composition on an inner side of an innerliner layer in a tire radial direction of the tread portion, the innerliner layer comprising a halogenated butyl rubber; wherein
the sealant material composition forming the sealant layer is a blend of from 0.1 parts by mass to 20 parts by mass of sulfur as a crosslinking agent, from 0.1 parts by mass to 40 parts by mass of an organic peroxide, and from 10 parts by mass to 400 parts by mass of a liquid polymer per 100 parts by mass of a rubber component.

2. The pneumatic tire according to claim 1, wherein the sealant layer has a thickness from 0.5 mm to 5.0 mm.

3. The pneumatic tire according to claim 1, wherein the sealant layer is a sheet-like molded sealant material made of the sealant material composition and is attached entirely around a circumference of a tire inner surface.

4. The pneumatic tire according to claim 1, wherein the sealant layer is a string-like or band-like molded sealant material made of the sealant material composition and is spirally attached to a tire inner surface.

5. The pneumatic tire according to claim 1, wherein a center position of the sealant layer in a tire lateral direction is arranged within a range of ±10 mm in the tire lateral direction from a tire equator.

6. The pneumatic tire according to claim 1, wherein a plurality of belt layers are embedded in the tread portion, a layer having a smallest belt width of the plurality of belt layers is a minimum belt layer, a layer having a largest belt width of the plurality of belt layers is a maximum belt layer, a distance from a tire equator to an end portion of the minimum belt layer is La, a distance from the tire equator to an end portion of the maximum belt layer is Lb, a distance from the tire equator to an end portion of the sealant layer in a tire lateral direction is Lc, and distances La, Lb, Lc satisfy a relationship $La \leq Lc \leq 1.05 \times Lb$.

* * * * *